United States Patent
Krishnan (10) Patent No.: US 7,006,222 B2
(45) Date of Patent: Feb. 28, 2006

(54) CONCURRENT MEASUREMENT AND CLEANING OF THIN FILMS ON SILICON-ON-INSULATOR (SOI)

(75) Inventor: Shankar Krishnan, Santa Clara, CA (US)

(73) Assignee: KLA-Tencor Technologies Corporation, Milpitas, CA (US)

(*) Notice: Subject to any disclaimer, the term of this patent is extended or adjusted under 35 U.S.C. 154(b) by 0 days.

(21) Appl. No.: 10/339,518

(22) Filed: Jan. 8, 2003

(65) Prior Publication Data

US 2004/0130718 A1 Jul. 8, 2004

(51) Int. Cl.
*G01J 4/00* (2006.01)

(52) U.S. Cl. .............................. 356/369; 356/445
(58) Field of Classification Search ............... 356/630, 356/631, 632, 369, 237.4, 237.5; 438/16; 134/1.1, 1.2, 1.3
See application file for complete search history.

(56) References Cited

U.S. PATENT DOCUMENTS

| | | | |
|---|---|---|---|
| 4,292,093 A | | 9/1981 | Ownby et al. |
| 4,522,510 A | * | 6/1985 | Rosencwaig et al. ....... 356/432 |
| 4,957,368 A | | 9/1990 | Smith |
| 5,420,680 A | * | 5/1995 | Isobe et al. ................. 356/369 |
| 5,438,415 A | * | 8/1995 | Kazama et al. ............. 356/369 |
| 5,523,543 A | * | 6/1996 | Hunter et al. .......... 219/121.62 |
| 5,604,581 A | * | 2/1997 | Liu et al. ....................... 356/73 |
| 5,608,526 A | | 3/1997 | Piwonka-Corle et al. |
| 5,669,979 A | * | 9/1997 | Elliott et al. ..................... 134/1 |
| 5,748,318 A | * | 5/1998 | Maris et al. ................. 356/630 |
| 5,800,625 A | * | 9/1998 | Engelsberg et al. ............. 134/1 |
| 5,900,633 A | * | 5/1999 | Solomon et al. ............ 356/632 |
| 6,153,444 A | * | 11/2000 | Nakano et al. ................ 438/16 |
| 6,178,973 B1 | * | 1/2001 | Franca et al. ................. 134/1.3 |
| 6,242,739 B1 | * | 6/2001 | Cherkassky ............ 250/339.11 |
| 6,261,853 B1 | | 7/2001 | Howell et al. |
| 6,274,874 B1 | * | 8/2001 | Sidhu ....................... 250/461.1 |
| 6,278,519 B1 | | 8/2001 | Rosencwaig et al. |
| 6,325,078 B1 | | 12/2001 | Kamieniecki |

(Continued)

FOREIGN PATENT DOCUMENTS

WO WO 01/11310 A1 2/2001

OTHER PUBLICATIONS

Deumie et al. "Ellipsometry of light scattering from multi-layer coatings," *Applied Optics*, vol. 35, No. 28, Oct. 1, 1996, pp. 5600-5608.

(Continued)

*Primary Examiner*—Samuel A. Turner
*Assistant Examiner*—Juan D. Valentin, II
(74) *Attorney, Agent, or Firm*—Bever, Hoffman & Harms, LLP; John M. Kubodera (57) ABSTRACT

A system for performing single wavelength ellipsometry (SWE) on a thin film on a multi-layer substrate such as silicon-on-insulator (SOI) applies a measurement beam having an absorption distance less than the thickness of the superficial layer of the multi-layer substrate. For example, for an SOI substrate, the measurement beam is selected to have a wavelength that results in an absorption distance that is less than the superficial silicon layer thickness. The system can include a cleaning laser to provide concurrent cleaning to enhance measurement accuracy without negatively impacting throughput. The measurement beam source can be configured to provide a measurement beam at one wavelength and a cleaning beam at a longer wavelength, so that the absorption depth of the measurement beam is less than the superficial layer thickness while the absorption depth of the cleaning beam is greater than the superficial layer thickness.

67 Claims, 9 Drawing Sheets

U.S. PATENT DOCUMENTS

| | | | |
|---|---|---|---|
| 6,335,208 B1 * | 1/2002 | Lowry | 438/15 |
| 6,392,756 B1 * | 5/2002 | Li et al. | 356/369 |
| 6,394,105 B1 * | 5/2002 | Boszormenyi et al. | 134/1.3 |
| 6,508,990 B1 * | 1/2003 | Yoshida et al. | 134/1.3 |
| 6,566,169 B1 * | 5/2003 | Uziel et al. | 438/906 |
| 6,762,836 B1 * | 7/2004 | Benicewicz et al. | 356/318 |
| 2003/0137662 A1 * | 7/2003 | Janik et al. | 356/369 |

OTHER PUBLICATIONS

Yamamoto et al. "Ellipsometry in the extreme ultraviolet region with multilayer polarizers," *Thin Solid Films* 313-314 (1998), pp. 751-755.

* cited by examiner

CONCURRENT MEASUREMENT AND CLEANING OF THIN FILMS ON SILICON-ON-INSULATOR (SOI)

FIELD OF THE INVENTION

This invention relates generally to measurement systems, and more particularly to a system and method for performing metrology on silicon-on-insulator structures.

BACKGROUND OF THE INVENTION

As the dimensions of semiconductor devices continue to shrink, accurate and efficient characterization of the components forming those devices becomes more critical. Typically, the manufacturing process for modern semiconductor devices includes the formation of a number of layers or "thin films" on a silicon wafer. The thin films can include oxide, nitride, and/or metal layers, among others. To ensure proper performance of the finished semiconductor devices, the thickness and composition of each thin film formed during the manufacturing process must be tightly controlled.

Single wavelength ellipsometry (SWE) is a technique for measuring thin film thickness by directing a single wavelength polarized beam at a thin film, and then measuring the change in polarization state of the reflected beam, as described in co-owned, co-pending U.S. patent application Ser. No. 09/298,007 ("System for Analyzing Surface Characteristics with Self-Calibrating Capability", Wang et al.), herein incorporated by reference. SWE is the most stable and reproducible measurement (metrology) technique for thin film thickness, and is therefore the technique of choice for measuring critical structures such as gate oxides.

Figure 1:
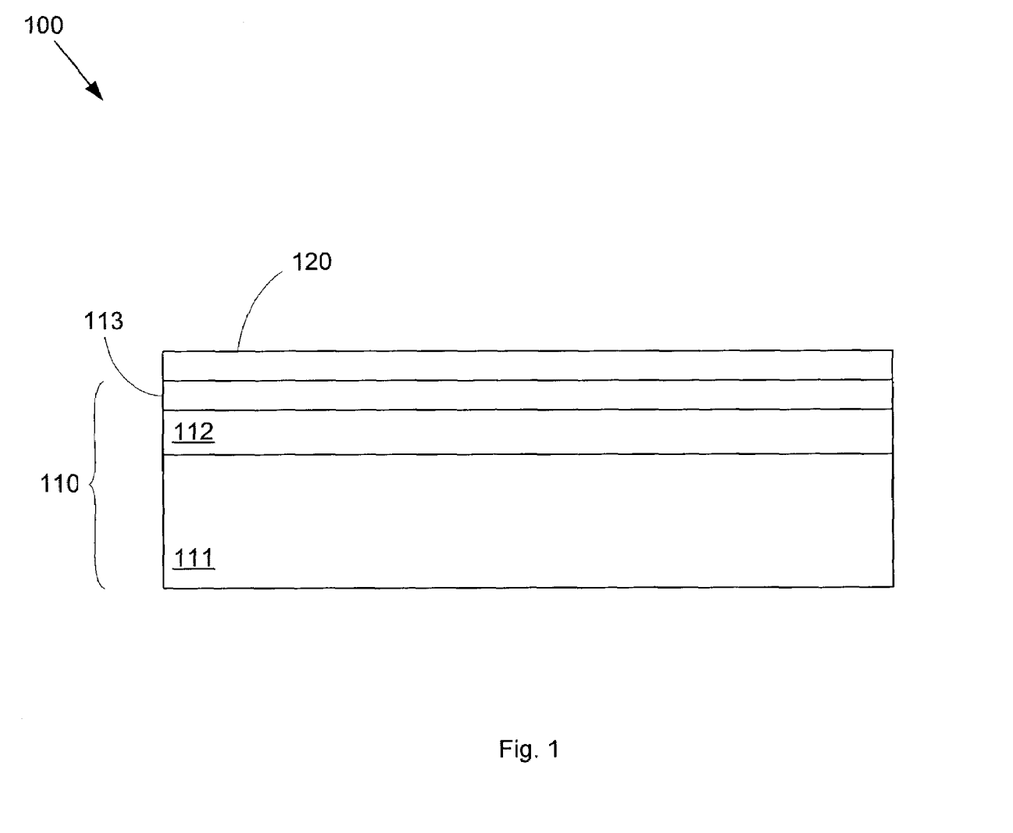
FIG. 1 is a cross section of an SOI substrate.

Unfortunately, certain modern process techniques can create problems for conventional SWE. For example, FIG. 1 shows a basic silicon-on-insulator (SOI) wafer 100, which can be used to improve the speed of metal-oxide-semiconductor (MOS) transistors in an IC. SOI wafer 100 includes a gate oxide layer 120 formed on an SOI substrate 110. SOI is formed by a silicon wafer 111, a buried insulator layer 112 formed on silicon wafer 111, and a superficial silicon layer 113 formed on buried insulator layer 112. Buried insulator layer 112 isolates devices formed in superficial silicon layer 113 from silicon wafer 111, thereby eliminating junction capacitance and allowing those devices to operate at a higher speed.

Modern SOI processes typically use a buried insulator thickness of somewhere between 500 Å and 2000 Å, and a superficial silicon layer thickness that is less than 500 Å. Device speed can be further improved by scaling the dimensions of the superficial silicon layer, and some advanced processes reduce the superficial silicon layer thickness down to roughly 200 Å. As the SOI dimensions are reduced, the thin film layers formed on SOI substrate 110 must also be scaled so that the full performance benefits can be reaped.

As SOI substrate dimensions decrease, the accuracy with which thin film layers (such as gate oxide layer 120) are formed on the SOI substrate becomes ever more critical. However, the lasers used by conventional SWE systems to generate measurement beams are ill-suited for SOI constructions. The measurement beam in a SWE system is partially reflected and partially transmitted by a thin film. The transmitted portion of the measurement beam is then partially reflected and partially transmitted by the substrate beneath the thin film. The beams reflected by the thin film and the substrate constructively and destructively interfere, thereby producing the characteristic output (reflected) beam used to determine the thickness of the thin film.

For thin films produced on conventional silicon substrates, the portion of the measurement beam transmitted by the substrate is eventually absorbed by the silicon substrate, and therefore does not affect the SWE measurement. However, any portion of the measurement beam transmitted by an SOT substrate can be reflected at the various layer interfaces of the multi-layer SOT substrate. Such spurious reflections can then alter the characteristic output beam, thereby degrading the accuracy of the SWE measurement.

Conventional SWE systems use lasers that generate beams in the visible or IR range, since such lasers are readily available and work well for gate oxide measurements (on monolithic silicon substrates). Often, the laser in a conventional SWE system is a helium-neon (He—Ne) laser operating at 632.8 nm or a yttrium-aluminum-garnet (YAG) lasers operating at 532 nm (frequency doubled). However, the absorption distance in silicon (i.e., the depth to which the beam will penetrate a material before the intensity of the beam is reduced to 1/e of its original level, where "e" is the natural logarithmic base, roughly equal to 2.718) for beams at these wavelengths is in the 600–1000 Å range. Such measurement beams are unacceptable for thin film measurement on SOI substrates, since the measurement beams will fully penetrate the 200–500 Å superficial silicon layer and therefore generate the spurious reflections that lead to measurement inaccuracy.

Consequently, spectroscopic ellipsometry (SE), rather than SWE, is used to measure thin films on SOT substrates. SE, such as described in co-owned U.S. Pat. No. 5,608,526 ("Focused Beam Spectroscopic Ellipsometry Method and System," issued Mar. 4, 1997 to Piwonka-Corle et al.), involves scanning a wide range of wavelengths simultaneously. The reflected radiation therefore includes multiple frequency components, allowing a spectrum of measured data to be read. From this spectrum the thicknesses of multiple layers in a material stack can be determined. To measure a thin film on an SOI substrate, SE is performed and the data associated with the SOI layers is discarded, leaving only the thin film information.

While this "selective" use of SE data allows thin films on SOT to be measured, SE is not the ideal technique for measuring single thin films (such as a gate oxide layer). The multiple measurement beam frequencies used in SE increase processing time (and therefore measurement throughput), and also reduce the accuracy of the actual measurement, since the effects of interactions between the multiple wavelength beams cannot be eliminated completely. Also, the complexity of SE hampers system-to-system matching because it is difficult to precisely restrict the range of wavelengths used in a SE system.

Another problem that impedes accurate thin film measurement on SOT substrates is contaminant layer growth. Modern thin films have reached the point where the accuracy and reproducibility of thin film measurements can be limited by contamination on the surface of the thin film. For example, airborne molecular contamination (AMC) such as water and other vapors can be absorbed onto the thin film, creating a contaminant layer that adversely affects optical ellipsometry (both SE and SWE).

Conventional methods for cleaning thin films include heating the entire wafer in an oven to a temperature of about 300° C. to vaporize any contaminant layer, as described in U.S. Pat. No. 6,325,078 ("Apparatus and Method for Rapid Photo-Thermal Surface Treatment," issued Dec. 4, 2001 to Kamieniecki), and placing the wafer on a heated stage, as described in U.S. Pat. No. 6,261,853 ("Method and Apparatus for Preparing Semiconductor Wafers for Measurement," issued Jul. 17, 2001 to Howell et. al.). However, these bulk heating systems require large thermal control components (e.g., lamps, heated stages, heat exchangers, etc.) that undesirably increase the cleanroom space required for these conventional cleaning systems. Furthermore, the long heatup and cooldown times required by bulk heating systems can significantly reduce throughput (as does the time required for transferring the wafer to and from the cleaning system). In addition, contaminants can redeposit on the cleaned wafer while it is being transferred from the cleaning system to the film analysis tool.

To improve throughput and reduce system footprint, a laser cleaning system can be incorporated into a metrology system, such as described in co-owned and co-pending U.S. Provisional Patent Application Ser. No. 60/426,138 ("Film Measurement with Interleaved Laser Cleaning," filed Nov. 13, 2002 by Janik), herein incorporated by reference. By including both a measurement beam source and a cleaning beam laser in a single metrology system, localized cleaning and measurement can be performed simultaneously or in rapid sequence to improve throughput. Furthermore, since a separate heating chamber is not required, total system footprint can be reduced. However, the use of multiple beam sources requires multiple alignment mechanisms, which increases system complexity.

Accordingly, it is desirable to provide a method and system for accurately measuring thin films on an SOI substrate that avoids the aforementioned problems associated with AMC contamination and regrowth, while minimizing system complexity.

SUMMARY OF THE INVENTION

The invention provides a system and method for accurate SWE measurements on multi-layer substrates such as SOI. By using a measurement beam having an absorption distance that is less than the thickness of the superficial layer of the multi-layer substrate, spurious reflections at layers beneath the superficial layer are eliminated.

According to an embodiment of the invention, a SWE system configured to generate a measurement beam having an absorption distance less than the superficial layer thickness of a multi-layer substrate can also include a cleaning beam generator to perform localized cleaning before and during SWE operations to improve measurement accuracy. By performing concurrent cleaning and measurement operations, SWE accuracy can be enhanced without significantly affecting measurement throughput.

According to an embodiment of the invention, a SWE system can use a single beam source to generate the measurement and cleaning beams for multi-layer substrates. The beam source can include frequency modulator(s) or adjusters to create harmonics of the fundamental beam frequency. For example, for an SOI substrate, a YAG laser can be used, with the fundamental line or second harmonic providing the cleaning beam and the fourth harmonic providing the measurement beam.

According to an embodiment of the invention, the cleaning beam can comprise a series of cleaning pulses, i.e., a series of on/off states. Depending on the characteristics of the pulsed cleaning beam, the pulse (on) portions may introduce local effects that could affect the measurements being taken by the analysis subsystem (of course, the non-pulse (off) portions of the pulsed cleaning beam will have no effect on the measurements). For example, each pulse of a laser cleaning beam could cause localized heating of the test sample that could in turn affect measurements taken at this elevated temperature.

Depending on the specific cleaning effects and the sensitivity of the analysis subsystem to those effects, various approaches can be taken to minimize their impact. According to an embodiment of the invention, if the cleaning effects are small enough, they can simply be ignored. According to another embodiment of the invention, the width (i.e., the duration of the pulse) and period (i.e., the time between the start of one pulse and the next) of the cleaning pulses in the pulsed cleaning beam could be timed to fall between measurement samples taken by the measurement subsystem. According to another embodiment of the invention, the analysis subsystem can include a clamp circuit that clamps measurement samples taken during each cleaning pulse (and during the cooldown period after each cleaning pulse) at the level of a measurement sample just before the cleaning pulse. According to another embodiment of the invention, post-processing can be performed on the sampled data to delete or replace measurement samples taken during each cleaning pulse and associated cooling period.

The present invention will be more fully understood in view of the following description and drawings.

DETAILED DESCRIPTION

By matching the wavelength of a measurement beam in a SWE system with the superficial silicon layer thickness in an SOI substrate, the invention enables the use of SWE to measure thin film thickness on SOI substrates. By selecting the measurement beam wavelength such that the absorption distance of the measurement beam is less than the thickness of the superficial silicon layer of the SOI substrate, spurious reflections at the interface between the superficial silicon layer and buried insulator layer can be eliminated.

Absorption distance in a particular material (such as silicon) is defined by the equation:

$$D = \lambda/(4\pi k) \qquad (1)$$

where D is the absorption distance, $\lambda$ is the wavelength of the measurement beam in the material, and k is the extinction coefficient for the material. Values for the extinction coefficient k of various materials are readily available from published literature. Note that in a material such as doped silicon, the value of extinction coefficient k will be affected by the specific dopant level within the silicon.

Figure 2:
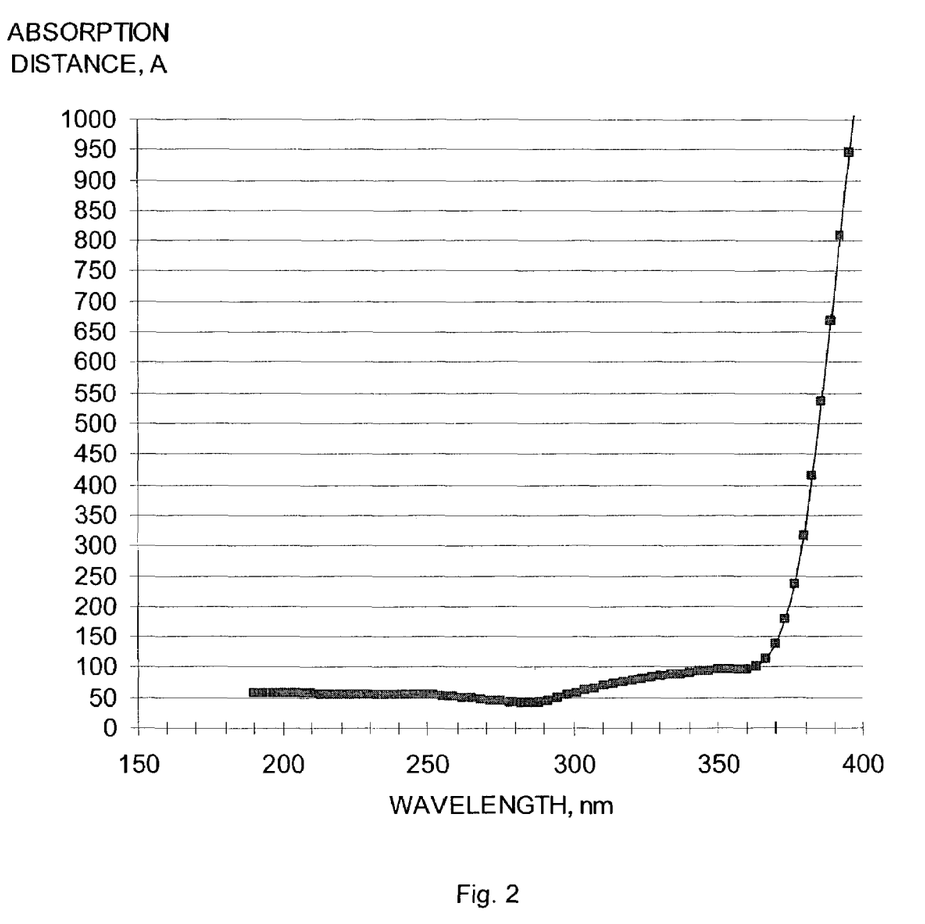
FIG. 2 is an absorption curve for silicon.

FIG. 2 shows a graph of a sample absorption curve, which indicates absorption distance into silicon versus wavelength. At a wavelength of roughly 390 nm, absorption distance is roughly 500 Å. Thus, according to an embodiment of the invention, SWE can be performed for a thin film on an SOI substrate by configuring the measurement beam to have a wavelength of roughly 390 nm or less (with the precise threshold wavelength determination being calculated from the actual absorption curve data).

The steep slope of the graph around 390 nm means that the actual absorption distance is highly sensitive to the precise wavelength of the measurement beam. A small wavelength inaccuracy in the measurement beam could result in excess beam penetration into the SOI substrate, leading to spurious reflections. However, as indicated by the graph, below a wavelength of about 365 nm, which corresponds to an absorption distance of roughly 100 Å, the slope of the absorption curve becomes much smaller, the curve stabilizes at roughly 50 Å below 290 nm. Therefore, according to another embodiment of the invention, by selecting the measurement beam wavelength to fall below the "knee" at 365 nm, a SWE system can be made much less sensitive to minor variations in measurement beam wavelength.

Figure 3:
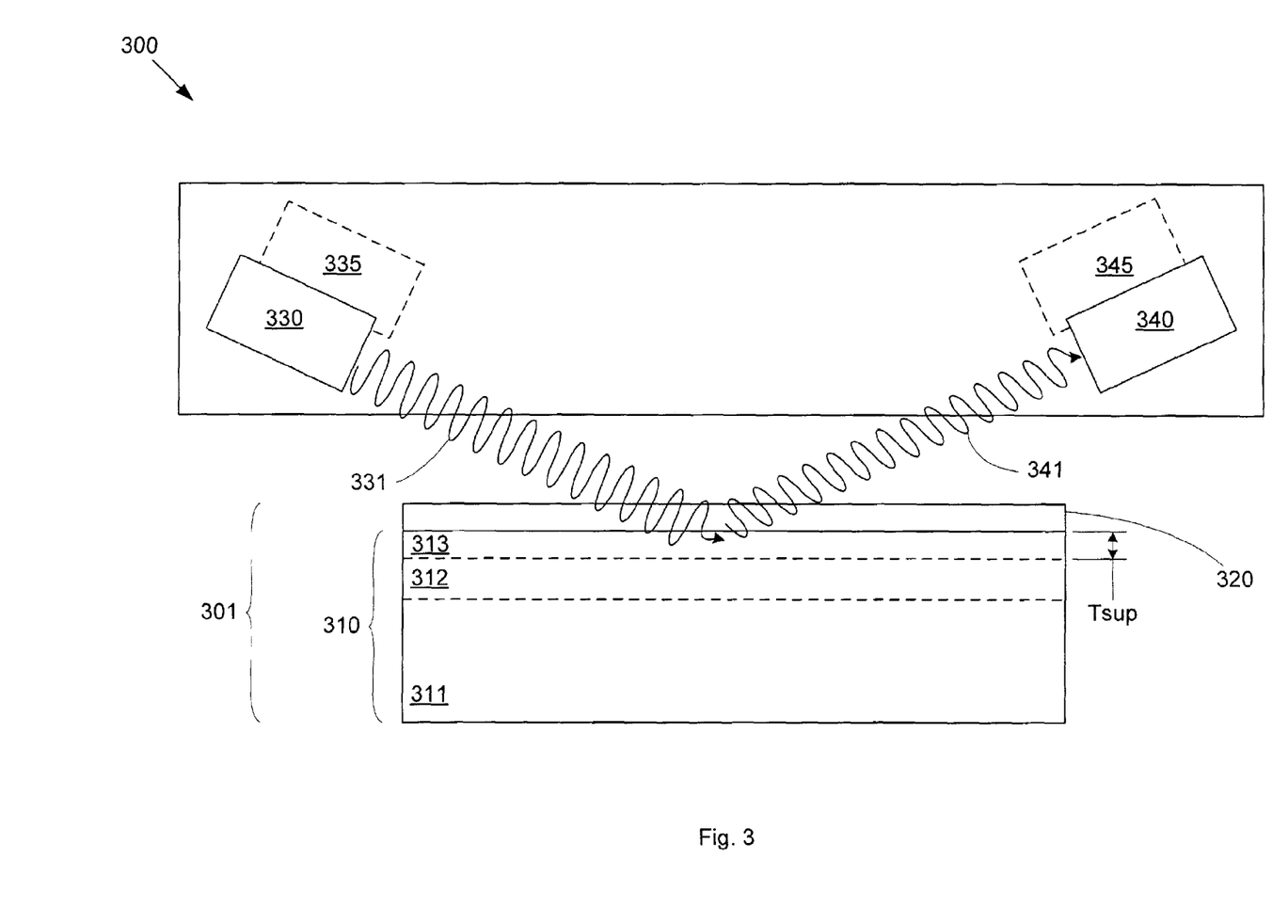
FIG. 3 is a schematic diagram of a SWE system, according to an embodiment of the invention.

FIG. 3 shows a SWE system 300 for measuring a test sample 301 that includes a thin film layer 320 formed on a multi-layer substrate 310, in accordance with an embodiment of the invention. Multi-layer substrate 310 comprises a superficial (top) layer 313, which has a thickness Tsup. Superficial layer 313 is formed over buried layers 312 and 311. According to an embodiment of the invention, substrate 310 can comprise an SOI substrate, with superficial layer 313 comprising a superficial silicon layer, and buried layers 312 and 311 comprising a buried insulator layer and a silicon substrate, respectively. Note that while multi-layer substrate 310 includes three layers for explanatory purposes, the invention can be used with any multi-layer substrate, as indicated by the dashed lines defining superficial layer 313 and buried layers 312 and 311.

SWE system 300 includes a measurement beam generator 330 and a measurement receiver 340. Measurement beam generator 330 directs a single wavelength measurement beam 331 at thin film layer 320, and a measurement receiver 340 measure the reflected radiation so that the desired ellipsometry calculations can be performed. Note that SWE system 300 can comprise any number of additional measurement beam generators and corresponding a measurement receiver, as indicated by the dashed lines around an additional measurement beam generator 335 and additional a measurement receiver 345.

Measurement beam generator 330 is configured such that the absorption distance of measurement beam 331 is less than thickness Tsup of superficial layer 313 of multi-layer substrate 310, thereby preventing measurement beam 331 from fully penetrating superficial layer 313 and generating spurious reflections.

For example, if substrate 310 comprises an SOI substrate with a superficial silicon layer thickness of 500 Å, measurement beam generator 330 can be configured to produce a measurement beam 331 having a wavelength less than 390 nm. In such a case, measurement beam generator 330 could comprise a frequency-quadrupled YAG laser that produces a 266 nm wavelength measurement beam.

Figure 4A:
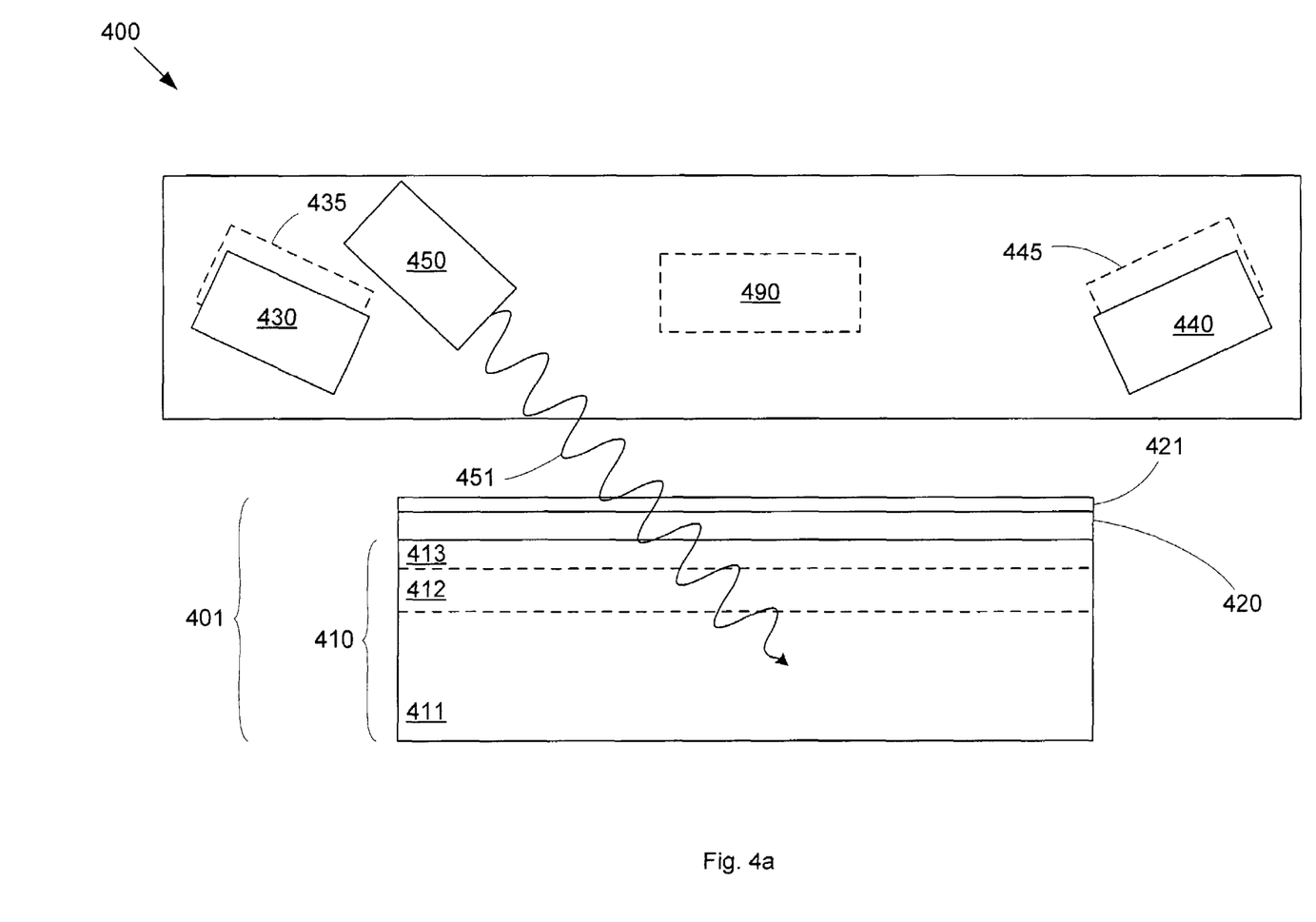
FIGS. 4a and 4b are schematic diagrams of a SWE system, in accordance with another embodiment of the invention.

FIG. 4a shows a SWE system 400 for measuring a test sample 401 that includes a thin film layer 420 formed on a multi-layer substrate 410, in accordance with another embodiment of the invention. Multi-layer substrate 410 is substantially similar to multi-layer substrate 310 shown in FIG. 3, and comprises a superficial (top) layer 413, which has a thickness Tsup and is formed over buried layers 412 and 411. According to an embodiment of the invention, substrate 410 can comprise an SOI substrate, with superficial layer 413 comprising a superficial silicon layer, and buried layers 412 and 411 comprising a buried insulator layer and a silicon substrate, respectively. Note that multi-layer substrate 410 can include any number of layers beneath superficial layer 413.

A contaminant layer 421 covers the surface of thin film layer 420. Contaminant layer 421 can comprise any unwanted material, such as AMC, on the surface of thin film layer 420. Note that while contaminant layer 421 is shown covering the entire surface of thin film layer 420 for explanatory purposes, contaminant layer 421 can also only partially cover thin film layer 420. Contaminant layer 421 can undesirably affect the accuracy of SWE measurements of thin film layer 420.

SWE system 400 includes a measurement beam generator 430, a measurement receiver 440, a cleaning beam generator 450, and optional data processing logic 490. Note that SWE system 400 can comprise any number of additional measurement beam generators and corresponding a measurement receiver, as indicated by the dashed lines around an additional measurement beam generator 335 and additional a measurement receiver 345.

To perform a cleaning operation, cleaning beam generator 450 directs a cleaning beam 451 at contaminant layer 421. Cleaning beam 451 is configured to remove enough of contaminant layer 421 to reveal a portion of thin film layer 312. This removal process can comprise either an interaction with contaminant layer 421 and/or an interaction with the underlying portion(s) of thin film layer 420 and/or substrate 410. The specific contaminant layer removal mechanism will depend on the type of cleaning beam used.

According to an embodiment of the invention, cleaning beam generator 430 can provide cleaning beam 431 as a pulsed beam. For example, cleaning beam source 430 could comprise a pulsed laser. If contaminant layer 421 comprises a 5 Å thick layer of water and organic materials (which is similar to AMC layers often formed on modern thin film layers during production), and substrate 410 comprises an SOI substrate, a Q-switched, frequency doubled YAG laser operating at 5–100 μJoules (and 532 nm) could be used as cleaning beam generator 450. Multiple 1–1000 ns pulses or even a single pulse such a laser could then heat the silicon substrate (layer 511), which in turn would heat the overlying portion of contaminant layer 521 to between roughly 300° C. to 1000° C., which is a temperature range sufficient to vaporize that portion of contaminant layer 521.

According to other embodiments of the invention, other types of pulsed lasers operating at different wavelengths could be used including pulsed diode or alexandrite lasers. According to another embodiment of the invention, a continuous laser, such as an argon-ion laser, could be externally modulated (such as with an acousto-optic or electro-optic modulator) to produce pulses. According to another embodiment of the invention, cleaning beam source 450 could comprise a flashlamp coupled to focusing optics to direct the high intensity light to the desired area on contaminant layer 421. According to other embodiments of the invention, cleaning beam emitter 450 can comprise a pulsed microwave source, a pulsed gas jet source, a pulsed acoustic source, a pulsed dry ice jet, or a pulsed ion beam source.

Figure 4B:
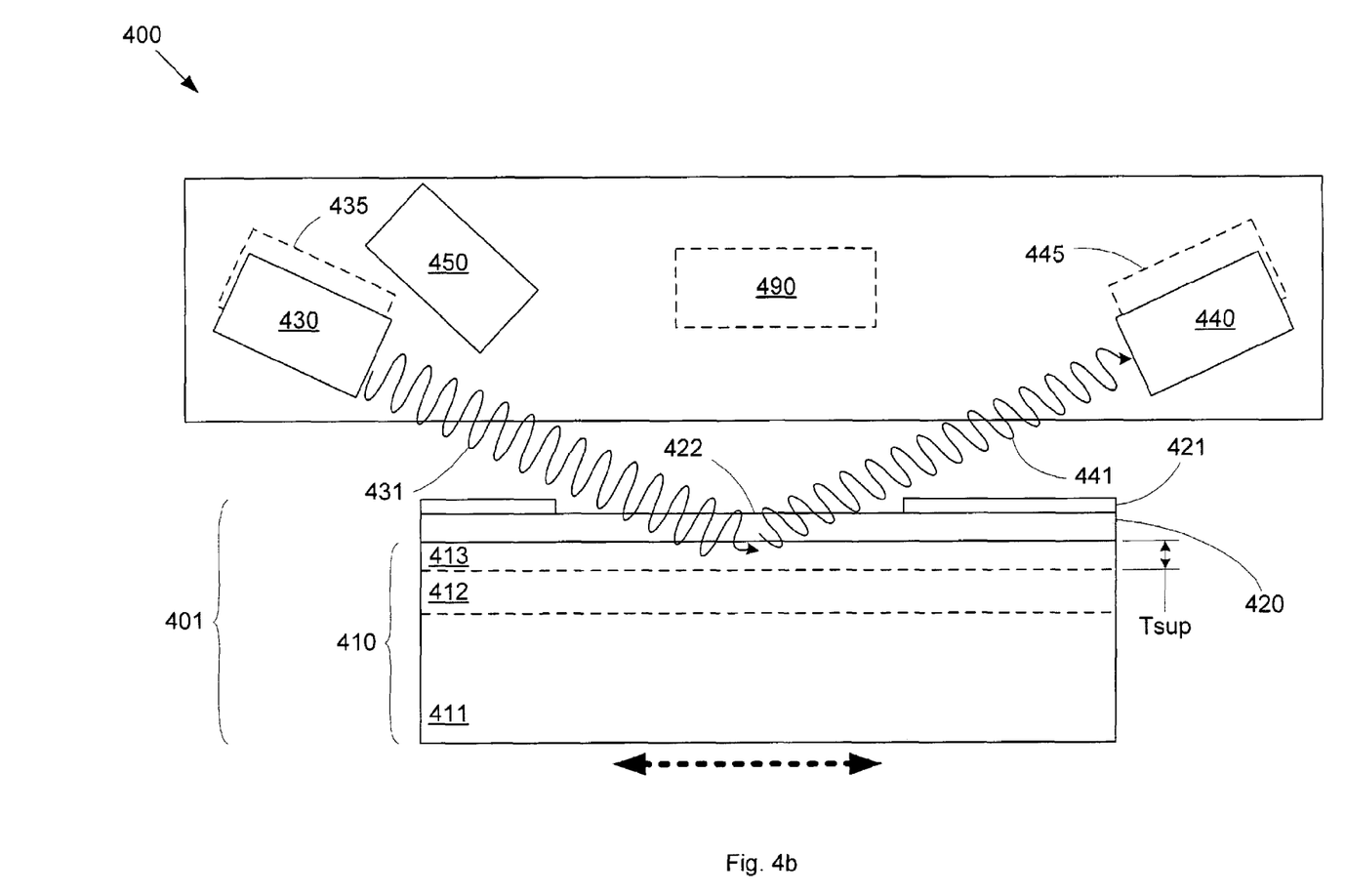

FIG. 4b shows SWE system 400 performing a SWE operation at a measurement location 422 on thin film layer 420 that has been exposed through contaminant layer 421 by the cleaning operation described with respect to FIG. 4a. Measurement beam generator 430 directs a single wavelength measurement beam 431 at measurement location 422 on thin film layer 420, and a measurement receiver 440 measures the reflected radiation so that the desired ellipsometry calculations can be performed. Optional data processing logic 490 can then perform any desired ellipsometry data processing. Measurement beam generator 430 is configured such that the absorption distance of measurement beam 431 is less than thickness Tsup of superficial layer 413 of multi-layer substrate 410, in a manner substantially similar to that described with respect to FIG. 3. In this manner, measurement beam 431 is prevented from fully penetrating superficial layer 413 and generating spurious reflections that could affect measurement accuracy.

Note that according to an embodiment of the invention, the relative position of measurement beam generator 430 and test sample 401 can be shifted between cleaning and measurement (SWE) operations to ensure that measurement beam 431 is directed onto thin film layer 420 at the exposed measurement location 422 (as indicated by the dashed arrow beneath test sample 401). According to another embodiment of the invention, measurement beam generator 430 and cleaning beam generator 450 can be focused at the same location, so that repositioning of test sample 401 between cleaning and measurement operations is not required.

Figure 5A:
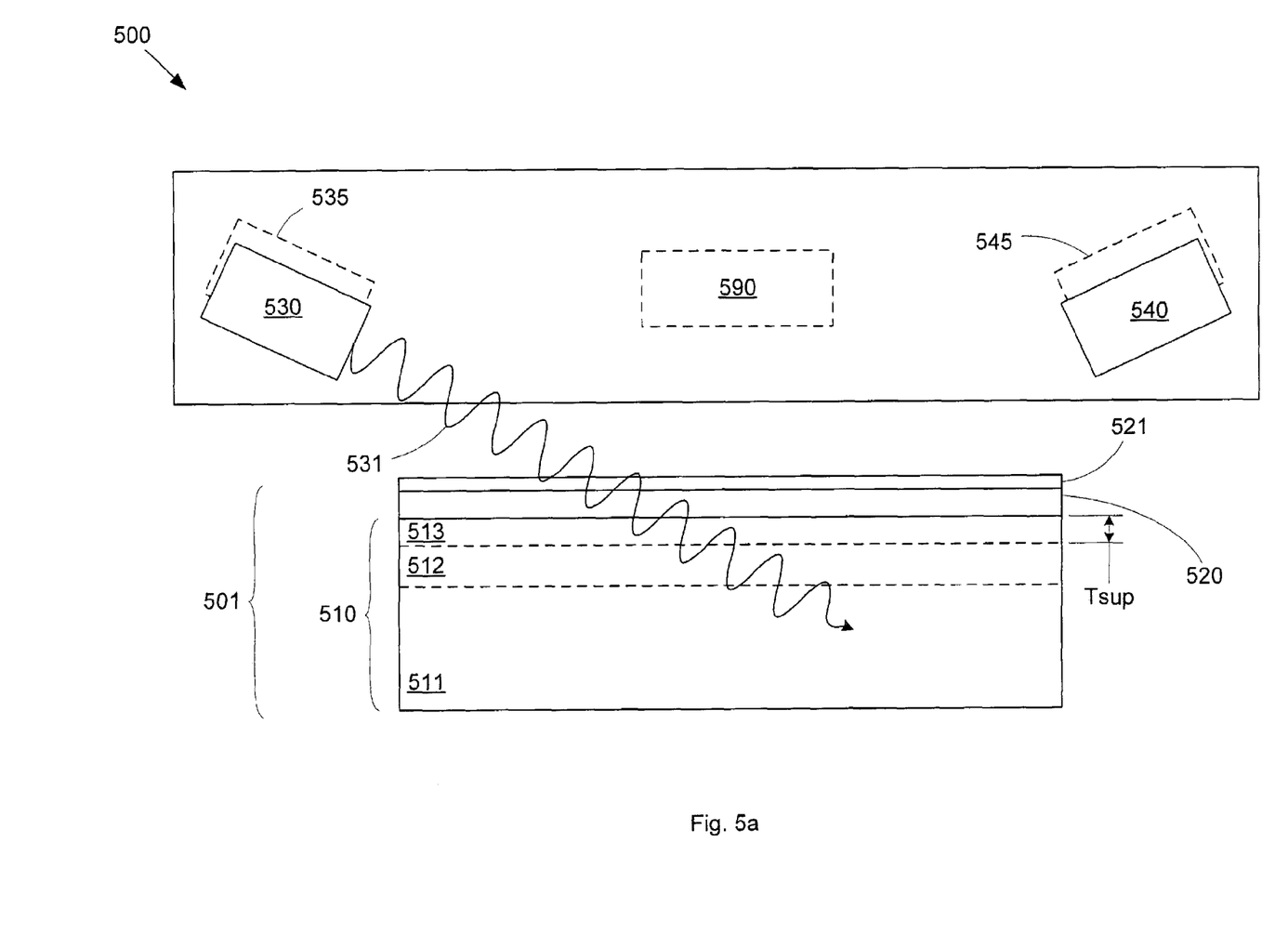
FIGS. 5a and 5b are schematic diagrams of a SWE system, in accordance with another embodiment of the invention.

FIG. 5 shows a SWE system 500 for measuring a test sample 501 that includes a thin film layer 520 formed on a multi-layer substrate 510, in accordance with another embodiment of the invention. Multi-layer substrate 510 is substantially similar to multi-layer substrate 310 shown in FIG. 3, and comprises a superficial (top) layer 513, which has a thickness Tsup and is formed over buried layers 512 and 511. According to an embodiment of the invention, substrate 510 can comprise an SOI substrate, with superficial layer 513 comprising a superficial silicon layer, and buried layers 512 and 511 comprising a buried insulator layer and a silicon substrate, respectively. Note that multi-layer substrate 510 can include any number of layers beneath superficial layer 513.

A contaminant layer 521 covers the surface of thin film layer 520. Contaminant layer 521 can comprise any unwanted material, such as AMC, on the surface of thin film layer 520. Note that while contaminant layer 521 is shown covering the entire surface of thin film layer 520 for explanatory purposes, contaminant layer 521 can also only partially cover thin film layer 520. Contaminant layer 521 can undesirably affect the accuracy of SWE measurements of thin film layer 520.

SWE system 500 includes a cleaning/measurement beam generator 530 and a measurement receiver 540. Cleaning/measurement beam generator 530 provides the cleaning beam for cleaning operations and the measurement beam for measurement operations, as described in detail below. Note that SWE system 500 can comprise any number of additional cleaning/measurement beam generators and corresponding a measurement receiver, as indicated by the dashed lines around an additional cleaning/measurement beam generator 535 and additional a measurement receiver 545.

To perform a cleaning operation, cleaning/measurement beam generator 530 directs a cleaning beam 531 at contaminant layer 521. The wavelength of cleaning beam 531 is selected such that the absorption distance of cleaning beam 531 is greater than a thickness Tsup of superficial layer 513. For example, if substrate 510 is an SOI substrate having a superficial silicon layer thickness of 500 Å, cleaning/measurement beam generator 530 can comprise a YAG laser, and cleaning beam 531 can comprise the fundamental line (i.e., 1064 nm) or the second harmonic (i.e., 532 nm) of the laser. In either case, the absorption depth of cleaning beam 531 would substantially exceed 500 Å, as indicated by the absorption curve shown in FIG. 2. Cleaning beam 531 is therefore able to deeply penetrate substrate 510 and provide sufficient localized heating for desorption of an overlying portion of contaminant layer 521.

Figure 5B:
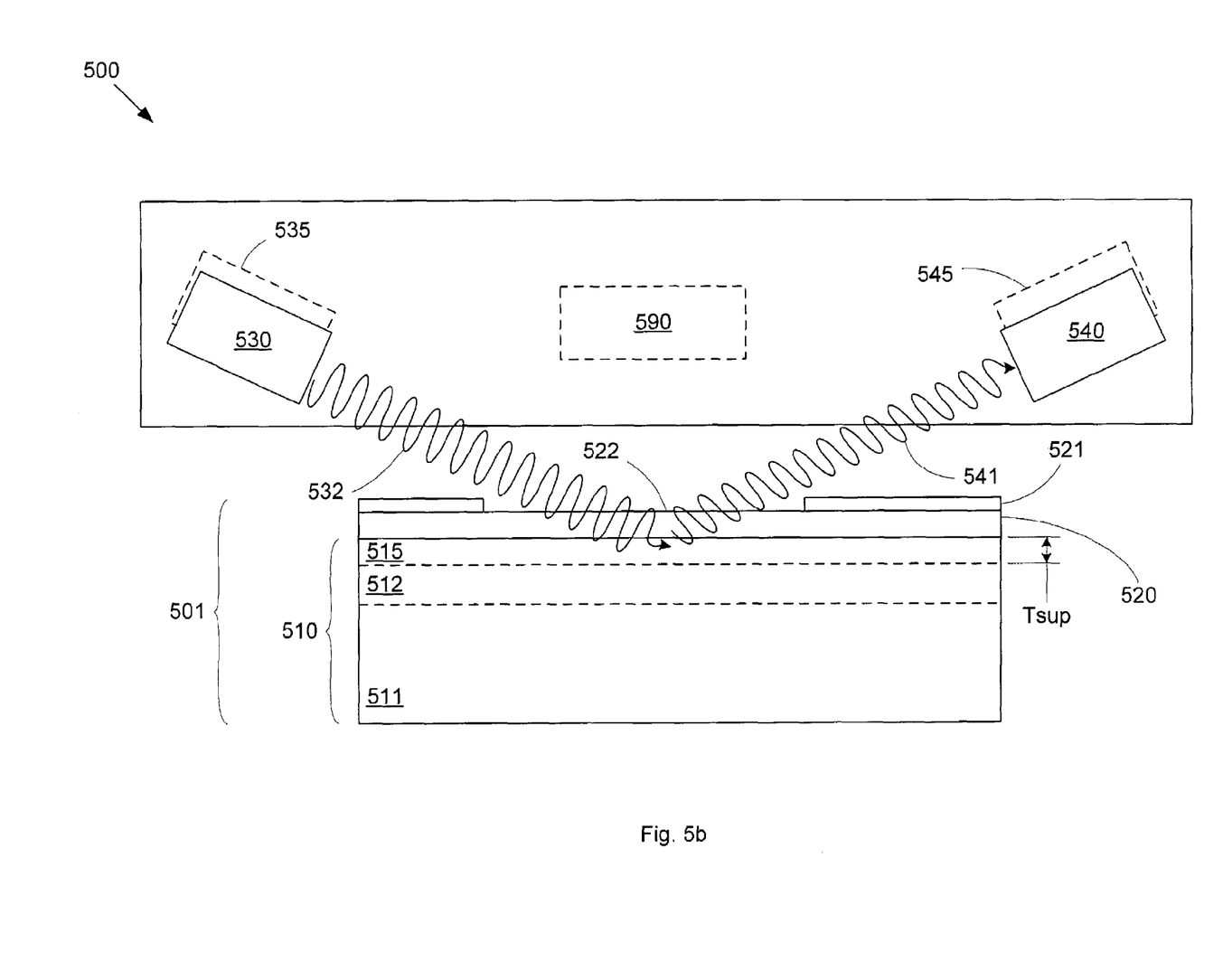

FIG. 5b shows SWE system 500 performing a SWE operation at a measurement location 522 on thin film layer 520 that has been exposed through contaminant layer 521 by the cleaning operation described with respect to FIG. 5a. Cleaning/measurement beam generator 530 directs a single wavelength measurement beam 532 at measurement location 522 on thin film layer 520, and a measurement receiver 540 measures the reflected radiation so that the desired ellipsometry calculations can be performed. Optional data processing logic 590 can then perform any desired ellipsometry data processing. In contrast to cleaning beam 531 described with respect to FIG. 5a, measurement beam 532 is configured to have a wavelength such that the absorption distance of measurement beam 532 is less than thickness Tsup of superficial layer 513. Therefore, for reasons substantially similar to those described with respect to FIG. 3, measurement beam 532 is prevented from fully penetrating superficial layer 513 and generating spurious reflections that could affect measurement accuracy.

Because cleaning/measurement beam generator 530 provides both cleaning and measurement beams, the size and cost of SWE system 500 can be reduced over SWE systems in which separate beam generators are used. For example, if cleaning beam 531 comprises the fundamental line (1064 nm) or second harmonic (532 nm) of a YAG laser, as described above with respect to FIG. 5a, measurement beam 532 in FIG. 5b can comprise the fourth harmonic (266 nm) of that same YAG laser.

Figure 6A:
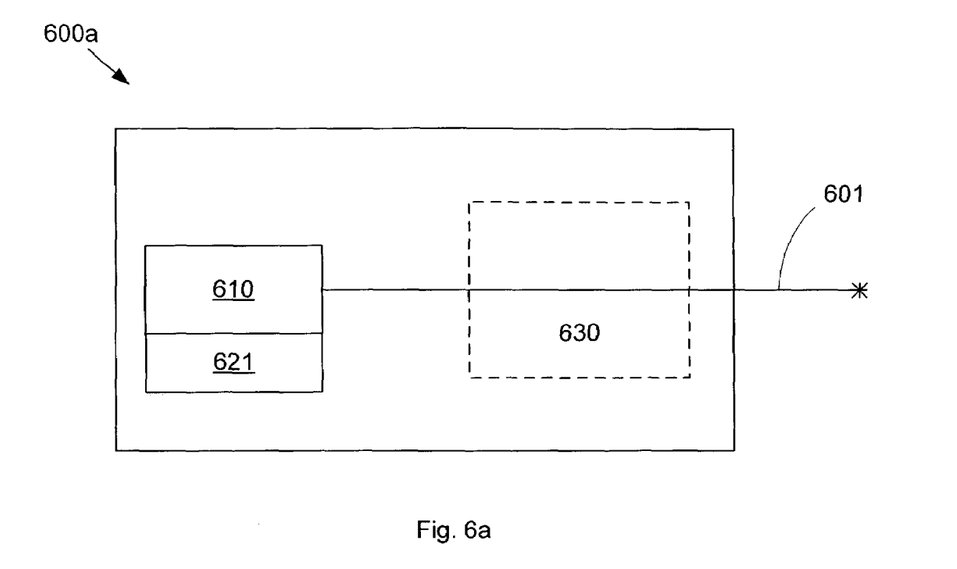
FIGS. 6a and 6b are schematic diagrams of cleaning/measurement beam generators according to various embodiments of the invention.

FIG. 6a shows a detail view of a cleaning/measurement beam generator 600a, according to an embodiment of the invention. Cleaning/measurement beam generator 600a can correspond to cleaning/measurement beam generator 530 shown in FIGS. 5a and 5b. Cleaning/measurement beam generator 600a includes a beam source 610, a modulator 621, and optional control optics 630. Modulator 621 regulates the output of beam source 610, so that output beam 601 has the desired wavelength characteristics. For example, beam source 610 could comprise a YAG matrix, and modulator 621 could control the frequency modulation of output beam 601; e.g., maintaining output beam 601 at the fundamental line or second harmonic during cleaning operations, and bumping output beam 601 up to the fourth harmonic during measurement operations. Control optics 630 can include polarizers, waveplates, focusing optics, and other optical elements required for a SWE operation.

Figure 6B:
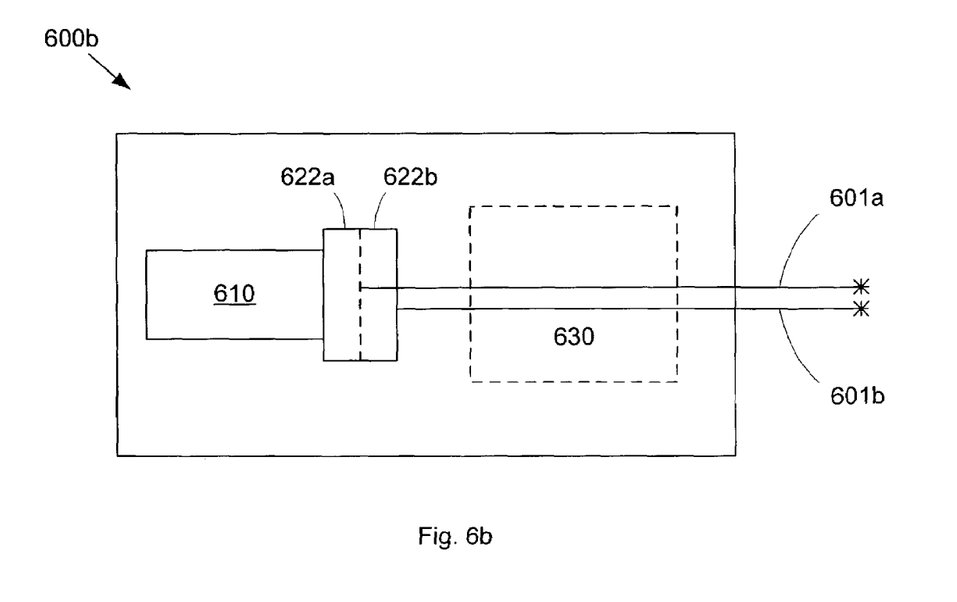

FIG. 6b shows a detail view of a cleaning/measurement beam generator 600b, according to an embodiment of the invention. Cleaning/measurement beam generator 600b can also correspond to cleaning/measurement beam generator 530 shown in FIGS. 5a and 5b. Cleaning/measurement beam generator 600b includes a beam source 610, frequency adjusters 622a and 622b, and optional control optics 630. Frequency adjusters 622a and 622b adjust the frequency of the output of beam source 610 to generate the desired cleaning and measurement beams. Control optics 630 can include polarizers, waveplates, focusing optics, and other optical elements required for a SWE operation.

Note that while two beam adjusters are depicted in FIG. 6b for explanatory purposes, cleaning/measurement beam generator 600*b* can include any number of beam adjusters, depending on the desired output beam characteristics. For example, beam source 610 could comprise a YAG matrix, and frequency adjusters 622*a* and 622*b* could comprise frequency doublers. Frequency adjuster 622*a* would then double the fundamental frequency of the raw beam to generate an output beam 601*a* at 532 nm that could be used as a cleaning beam. Meanwhile, frequency adjuster 622*b* could double that beam frequency to generate an output beam 601*b* at 266 nm for use as a measurement beam. Note that while output beams 601*a* and 601*b* are depicted as travelling along separate paths for explanatory purposes, according to other embodiments of the invention, output beams 601*a* and 601*b* (e.g., the cleaning beam and the measurement beam, respectively) could be collinear. Note further that both frequency adjusters can operate individually or concurrently, thereby allowing output beams 601*a* and 601*b* to be emitted individually or simultaneously.

According to an embodiment of the invention, the cleaning and measurement operations performed by SWE system 400 (shown in FIGS. 4*a* and 4*b*) and SWE system 500 (shown in FIGS. 5*a* and 5*b*) can be performed sequentially. According to another embodiment of the invention, the cleaning and measurement operations can be performed concurrently, either by performing cleaning and measurement simultaneously, or by performing the two operations in an alternating sequence. Performing cleaning operations during the measurement operation(s) prevents regrowth of contamination on the thin film layer, and also allows a lower cleaning beam power to be used than is the case where cleaning and measurement are separated in space and time (i.e., where cleaning intervals are much greater), thereby reducing the risk of damage to the test sample. The risk of damage can be further reduced by performing the cleaning operation on non-functional regions of the test sample (e.g., regions such as scribe lines that will not be part of the functional portion(s) of the final devices).

According to another embodiment of the invention, an initial cleaning operation can be performed before concurrent cleaning and measurement operations to provide an initial exposed region of the thin film layer. To provide the desired amount of initial cleaning, cleaning beam generator 450 in FIG. 4 or cleaning/measurement beam generator 530 in FIG. 5 could apply a predefined number of cleaning pulses to contaminant layer 421 or 521, respectively. Note that the duration and/or period of these initial cleaning pulses do not necessarily have to be the same as the duration and/or period of the cleaning pulses used for the concurrent cleaning operation (i.e., the cleaning operation performed concurrently with the measurement operation).

Note that depending on the characteristics of cleaning beam 451 in FIG. 4 or cleaning beam 531 in FIG. 5, the individual cleaning pulses of the beam may or may not introduce some inaccuracy into any concurrent SWE measurements. For example, heat used to desorb a portion of the contaminant layer could cause temporary deformations in the thin film layer and substrate that could affect the output radiation. According to an embodiment of the invention, because the recovery period from disturbances caused by such "cleaning effects" is typically much shorter than the time required for significant AMC regrowth, cleaning effects can simply be ignored; i.e., any measurement inaccuracy due to the cleaning beam will simply be accepted.

According to other embodiments of the invention, the cleaning effects can be compensated for in various ways, such as properly setting cleaning pulse timing, adjusting the measurement sampling characteristics, or selectively processing the raw data measurements. According to an embodiment of the invention, implementation of any of these compensation techniques can be simplified by setting the cleaning pulse rate (i.e., the number of cleaning pulses per unit time) of cleaning beam 451 or 531 equal to a submultiple of the sampling rate of a measurement receiver 440 or 540, respectively, in which case the cleaning beam would introduce a substantially constant cleaning effect at constant intervals.

Figures 7A, 7B:
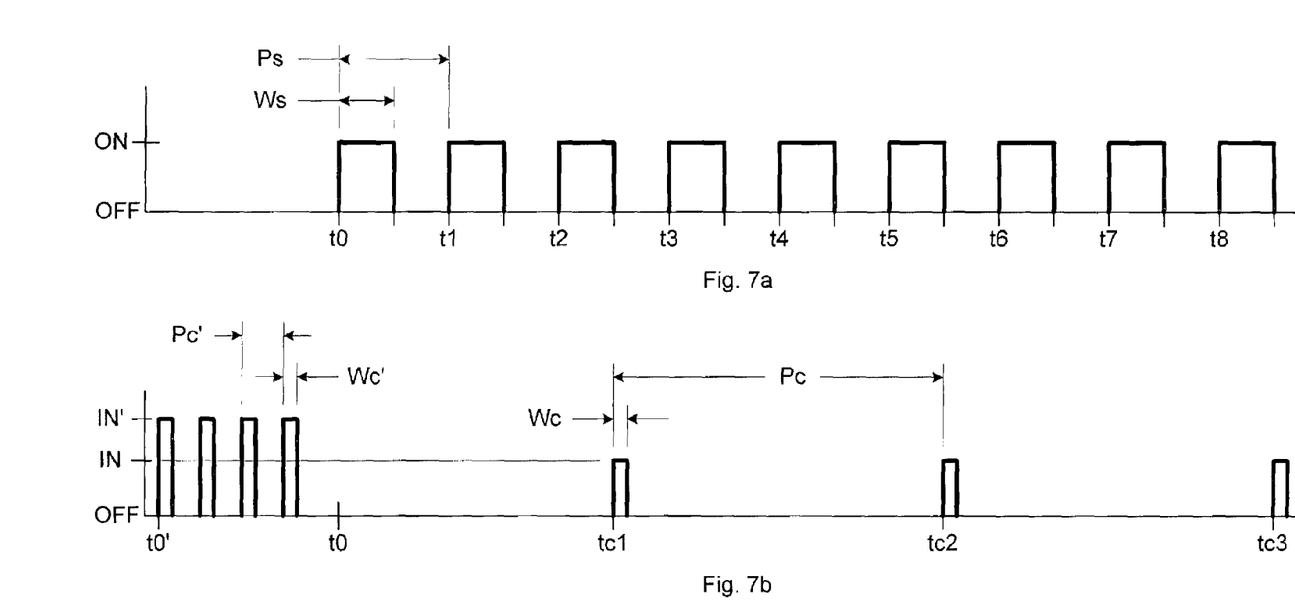
FIGS. 7a, 7b, and 7c are graphs comparing sampling rate with cleaning pulses and cleaning effects according to an embodiment of the invention.

FIG. 7*a* shows an example sampling rate graph for SWE system 400 shown in FIGS. 4*a* and 4*b*, and SWE system 500 shown in FIGS. 5*a* and 5*b*. The data sampling begins at a time t0, and has a sampling period Ps (i.e., the time between the start of one sampling pulse and the start of the next sampling pulse; equal to 1/sampling rate) and sample width Ws (i.e., the duration of a sampling pulse). Nine samples are shown, taken at times t0–t8 (although any number of samples can be taken).

FIG. 7*b* shows an example cleaning pulse graph for cleaning beam 451 of SWE system 400 or cleaning beam 531 or SWE system 500 that could be used in conjunction with the sampling rate profile shown in FIG. 7*a*. Prior to time t0 (i.e., prior to the start of data sampling), a quantity of cleaning pulses having an intensity IN', widths Wc' and a period Pc' are applied to the test sample beginning at time t0' to perform an initial cleaning operation. Once data sampling has begun (i.e., after time T0), cleaning pulses are applied having an intensity IN, widths Wc and period Pc.

Note that cleaning pulse intensity IN, width Wc, and period Pc can be different from cleaning pulse intensity IN', width Wc' and period Pc', respectively. For example, to reduce the time required for the initial cleaning operation, cleaning pulse width Wc' can be set larger than cleaning pulse width Wc and/or period Pc' can be set shorter than period Pc.

Figure 7C:
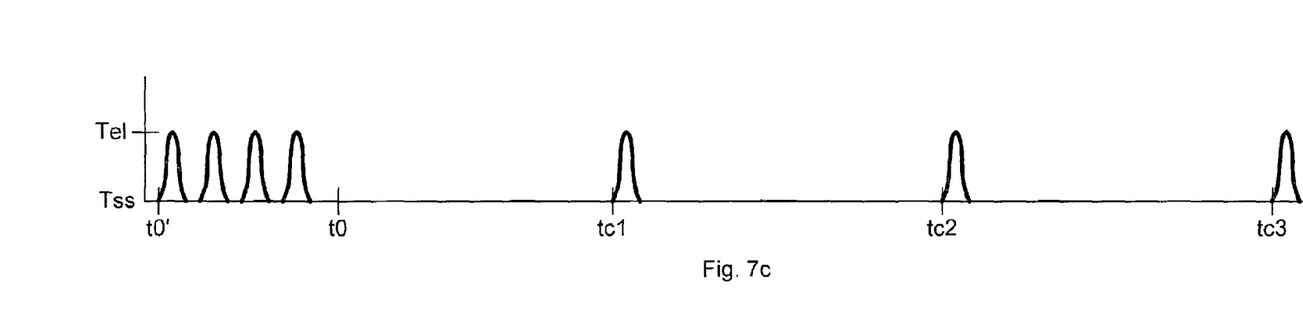

FIG. 7*c* shows a possible temperature profile for test sample 401 in FIGS. 4*a* and 4*b* or test sample 501 in FIGS. 5*a* and 5*b*, when subjected to a cleaning beam having the cleaning pulse profile shown in FIG. 7*b*. Each cleaning pulse shown results in a corresponding temperature spike. That is, cleaning pulses at times tc1, tc2, and tc3, shown in FIG. 7*b*, produce corresponding temperature spikes at the same times in FIG. 7*c*. As indicated, the local temperature of the test sample rises from a steady-state temperature Tss to an elevated temperature Tel. Because the analysis location is generally a small portion of a much larger test sample, any heating from a cleaning pulse is rapidly dissipated, hence the narrow widths of the temperature spikes shown in FIG. 7*c*. For example, in a silicon wafer, the temperature spike from a 60 ns cleaning pulse from a 532 nm laser will have a width on the order of 1 $\mu$s.

According to an embodiment of the invention, by timing the cleaning pulses to fall between data samples, the temperature disturbances caused by the cleaning pulses have time to dissipate and therefore not affect the actual measurements. By setting the cleaning pulses to occur immediately after the completion of a data sample, the allowable recovery period (cooling time) for that cleaning pulse can be maximized. For example, time tc1 of FIG. 7*b* could be set equal to time t2 of FIG. 7*a* added to sample width Ws. Similarly, time tc2 could be set equal to time t5 added to sample width Ws and time tc3 could be set equal to time t8 added to sample width Ws.

Note that even if some portion of cleaning-induced temperature effects "bleeds" into some of the data samples, by averaging multiple samples to obtain final measurements, such transient heating effects will be "smoothed out". This smoothing effect can be enhanced by increasing the sampling rate of the SWE system. According to other embodiments of the invention, a modulator in the beam generator (such as modulator 621 shown in FIG. 6a) could block the measurement beam during the cleaning pulse and any subsequent cooling period so that no information from the sample is received during cleaning (and cooling) operations. The modulator could also block the measurement beam between sampling pulses to avoid introducing artifacts at the cleaning laser pulse rate. Blocking the measurement laser between each sampling pulse would introduce a known, fixed artifact at the sampling rate that can be accounted for in downstream processing, thereby effectively making each inter-sampling interval identical, whether or not a cleaning pulse occurs. According to another embodiment of the invention, data processing logic 490 (in FIGS. 4a and 4b) or data processing logic 590 (in FIGS. 5a and 5b) can clamp the sample data at a predetermined level or even delete the data altogether during cleaning pulses (and any associated cooldown time) to avoid cleaning effects.

The various embodiments of the structures and methods of this invention that are described above are illustrative only of the principles of this invention and are not intended to limit the scope of the invention to the particular embodiments described. Thus, the invention is limited only by the following claims and their equivalents.

What is claimed is:

1. A method for measuring the thickness of a thin film on a multi-layer substrate, the multi-layer substrate comprising a superficial layer formed on at least one buried layer, the superficial layer having a first thickness, the superficial layer comprising a first material, the method comprising:
    performing a single wavelength ellipsometry (SWE) operation on the thin film by directing a first measurement beam at an analysis location on the thin film, the first measurement beam having a first absorption depth in the first material, and the first absorption depth being less than the first thickness.

2. The method of claim 1, wherein the multi-layer substrate comprises a silicon-on-insulator (SOI) substrate, wherein the superficial layer comprises a silicon layer.

3. The method of claim 2, wherein the first thickness is less than 500 Å and the first measurement beam has a wavelength less than 390 nm.

4. The method of claim 1, further comprising performing a first cleaning operation on the thin film to remove a contaminant layer at the analysis location, wherein performing the first cleaning operation comprises directing a first cleaning beam at the analysis location, the cleaning beam having a second absorption depth in the first material, the second absorption depth being greater than the first thickness.

5. The method of claim 4, wherein performing the first cleaning operation is performed before performing the SWE operation.

6. The method of claim 4, wherein performing the first cleaning operation and performing the SWE operation are performed concurrently.

7. The method of claim 6, further comprising performing a second cleaning operation by directing a second cleaning beam at the analysis location, the cleaning beam having a third absorption depth in the first material, the third absorption depth being greater than the first thickness, wherein performing the second cleaning operation is performed prior to performing the SWE operation.

8. The method of claim 7, wherein the first cleaning beam comprises a series of first cleaning pulses having a first period, each of the first cleaning pulses having a first width and a first intensity, and
    wherein the second cleaning beam comprises a series of second cleaning pulses having a second period, each of the second cleaning pulses having a second width and a second intensity, wherein at least one of the second period, the second width, and the second intensity is different from the first period, the first width, and the first intensity, respectively.

9. The method of claim 6, wherein the first cleaning beam comprises a series of first cleaning pulses, and wherein performing the SWE operation further comprises sampling an output beam generated from the analysis location in response to the first measurement beam using a series of sampling pulses, each of the first cleaning pulses occurring between sampling pulses.

10. The method of claim 9, wherein each of the first cleaning pulses occurs immediately after one of the sampling pulses.

11. The method of claim 6, wherein the first cleaning beam comprises a series of first cleaning pulses, wherein performing the SWE operation further comprises sampling an output beam generated from the analysis location in response to the first measurement beam at a sampling rate, and wherein the first cleaning beam comprises a cleaning pulse rate, the cleaning pulse rate being equal to a submultiple of the sampling rate.

12. The method of claim 6, wherein the first cleaning beam comprises a series of first cleaning pulses,
    wherein performing the SWE operation further comprises sampling an output beam generated from the analysis location in response to the first measurement beam using a series of sampling pulses at a sampling rate, and
    wherein directing the first measurement beam at the analysis location comprises:
        modulating the first measurement beam into a series of measurement pulses having a measurement pulse rate, the measurement pulse rate being equal to the sampling rate; and
        blocking the first measurement beam during each of the first cleaning pulses.

13. The method of claim 12, wherein each of the first cleaning pulses heats the analysis location above a baseline temperature, the analysis location returning to the baseline temperature after a cooldown period after each first cleaning pulse, wherein directing the first measurement beam at the analysis location further comprises blocking the first measurement beam during the cooldown period after each first cleaning pulse.

14. The method of claim 1, wherein directing the first measurement beam at the analysis location further comprises blocking the first measurement beam between sampling pulses.

15. The method of claim 4, wherein the first cleaning beam comprises a series of first cleaning pulses, and wherein performing the SWE operation further comprises:
    gathering data samples of beam characteristics for an output beam generated from the analysis location in response to the first measurement beam; and
    clamping the data samples at a first level during each of the first cleaning pulses, the first level comprising the beam characteristics for the output beam just prior to each of the first cleaning pulses.

16. The method of claim 15, wherein each of the first cleaning pulses disturbs the analysis location from a baseline condition, the analysis location returning to the baseline condition after a recovery period after each first cleaning pulse, wherein analyzing the test sample further comprises clamping the data samples at the first level during the recovery, period after each first cleaning pulse.

17. The method of claim 6, wherein the first cleaning beam comprises a series of first cleaning pulses, and wherein analyzing the test sample further comprises:
gathering data samples from an output beam generated from the analysis location in response to the first measurement beam; and
deleting data samples taken during each of the first cleaning pulses.

18. The method of claim 17, wherein each of the first cleaning pulses disturbs the analysis location from a baseline condition, the analysis location returning to the baseline condition after a recovery period after each first cleaning pulse, wherein analyzing the test sample further comprises deleting data samples taken during the recovery period after each first cleaning pulse.

19. The method of claim 1, further comprising performing a second SWE operation on the thin film by directing a second measurement beam at the analysis location on the thin film, the second measurement beam having a second absorption depth in the first material, the second absorption depth being less than the first thickness.

20. A system for performing single wavelength ellipsometry (SWE) on a thin film, the thin film being formed on a multi-layer substrate, the multi-layer substrate comprising a superficial layer formed on at least one buried layer, the superficial layer comprising a first material and having a first thickness, the system comprising:
a measurement beam generator for directing a measurement beam having a first wavelength at an analysis location on the thin film to perform SWE, the measurement beam having a first absorption depth in the first material, the first absorption depth being less than the first thickness; and
a measurement receiver for taking measurement samples of beam characteristics for an output beam generated from the analysis location in response to the measurement beam.

21. The system of claim 20, wherein the multi-layer substrate comprises a silicon-on-insulator (SOI) substrate, and wherein the superficial layer comprises a silicon layer.

22. The system of claim 21, wherein the first thickness is less than 500 Å and the first wavelength is less than 390 nm.

23. The system of claim 20, further comprising a cleaning beam generator for directing a cleaning beam at the analysis location during a cleaning operation to remove contaminant material from the analysis location.

24. The system of claim 23, wherein the cleaning beam generator comprises one of a pulsed laser, an externally-modulated continuous laser, a flashlamp coupled to focusing optics, a pulsed microwave source, a pulsed gas jet source, a pulsed acoustic source, a pulsed dry ice jet, and a pulsed ion beam source.

25. The system of claim 23, wherein the measurement beam generator is the cleaning beam generator, and wherein cleaning beam has a second absorption depth in the first material, the second absorption depth being greater than the first thickness.

26. The system of claim 25, wherein the measurement beam generator comprises:
a laser source for providing an output beam; and
a modulator for setting the output beam to a first wavelength to generate the measurement beam, and for setting the output beam to a second wavelength to generate the cleaning beam, the first wavelength being less than the second wavelength.

27. The system of claim 26, wherein the laser source comprises a yttrium-aluminum-garnet (YAG) laser, the first wavelength being equal to 266 nm, and the second wavelength being equal to 1032 nm or 532 nm.

28. The system of claim 25, wherein the measurement beam generator comprises:
a laser source for providing an output beam; and
at least one beam adjuster for adjusting the frequency of the output beam to generate the measurement beam and the cleaning beam.

29. The system of claim 28, wherein the laser source comprises a yttrium-aluminum-garnet laser, and wherein the at least one beam adjuster comprises a first beam doubler and a second beam doubler, the first beam doubler generating the second harmonic of the output beam to provide the cleaning beam, and the second beam doubler working with the first beam doubler to generate the fourth harmonic of the output beam to provide the measurement beam.

30. The system of claim 23, wherein the measurement beam generator and the cleaning beam generator concurrently direct the measurement beam and the cleaning beam, respectively, at the analysis location.

31. The system of claim 30, wherein the cleaning beam comprises a series of cleaning pulses, and wherein the measurement beam generator comprises a modulator for blocking the measurement beam during cleaning pulses.

32. The system of claim 31, wherein each cleaning pulse disturbs the analysis location from a baseline condition for a first duration after the each cleaning pulse, and wherein the modulator further blocks the measurement beam for the first duration after each cleaning pulse.

33. The system of claim 30, wherein the cleaning beam comprises a series of cleaning pulses, the system further comprising data processing logic for clamping the measurement samples at a predetermined level during cleaning pulses.

34. The system of claim 33, wherein each cleaning pulse disturbs the analysis location from a baseline condition for a first duration after the each cleaning pulse, and wherein the data processing logic further clamps the measurement samples at the predetermined level for the first duration after each cleaning pulse.

35. The system of claim 30, wherein the cleaning beam comprises a series of cleaning pulses, the system further comprising data processing logic for deleting measurement samples taken during cleaning pulses.

36. The system of claim 35, wherein each cleaning pulse disturbs the analysis location from a baseline condition for a first duration after the each cleaning pulse, and wherein the data processing logic further deletes measurement samples taken during the first duration after each cleaning pulse.

37. A single wavelength ellipsometry (SWE) system for analyzing a test sample, the test sample comprising a thin film formed on a multi-layer substrate, the multi-layer substrate comprising a superficial layer formed on at least one buried layer, the superficial layer comprising a first material and having a first thickness, the system comprising:
means for directing a measurement beam having a first wavelength at an analysis location on the thin film to perform SWE, the measurement beam having a first absorption depth in the first material, the first absorption depth being less than the first thickness; and means for taking measurement samples of beam characteristics for an output beam generated from the analysis location in response to the measurement beam.

38. The SWE system of claim 37, wherein the multi-layer substrate comprises a silicon-on-insulator (SOI) substrate, and wherein the superficial layer comprises a silicon layer.

39. The SWE system of claim 38, wherein the first thickness is less than 500 Å and the first wavelength is less than 390 nm.

40. The SWE system of claim 37, further comprising means for directing a cleaning beam at the analysis location during a cleaning operation to remove contaminant material from the analysis location.

41. The SWE system of claim 40, wherein the means for directing the cleaning beam comprises the means for directing the measurement beam, and wherein cleaning beam has a second absorption depth in the first material, the second absorption depth being greater than the first thickness.

42. The SWE system of claim 41, wherein the measurement beam generator comprises:
   means for generating an output beam; and
   means for adjusting the output beam to a first wavelength and a second wavelength to generate the measurement beam and the cleaning beam, respectively, the first wavelength being less than the second wavelength.

43. The SWE system of claim 42, wherein the means for generating the output beam comprises a yttrium-aluminum-garnet (YAG) laser, the first wavelength being equal to 266 nm, and the second wavelength being equal to 1032 nm or 532 nm.

44. The SWE system of claim 43, wherein the means f or adjusting the output beam comprises a frequency modulator for controlling the means for generating the output beam.

45. The SWE system of claim 43, wherein the means for adjusting the output beam comprises:
   a first frequency doubler for doubling the frequency of the output beam to generate the cleaning beam; and
   a second frequency doubler for doubling the frequency of the cleaning beam to generate the measurement beam.

46. The SWE system of claim 40, wherein the cleaning beam comprises a series of cleaning pulses, and wherein the means for directing the measurement beam comprises means for blocking the measurement beam during cleaning pulses.

47. The SWE system of claim 46, wherein each cleaning pulse disturbs the analysis location from a baseline condition for a first duration after the each cleaning pulse, and wherein the means for blocking the measurement beam further blocks the measurement beam for the first duration after each cleaning pulse.

48. The SWE system of claim 40, wherein the cleaning beam comprises a series of cleaning pulses, the SWE system further comprising means for clamping the measurement samples at a predetermined level during cleaning pulses.

49. The SWE system of claim 48, wherein each cleaning pulse disturbs the analysis location from a baseline condition for a first duration after the each cleaning pulse, and wherein the means for clamping the measurement samples further clamps the measurement samples at the predetermined level for the first duration after each cleaning pulse.

50. The SWE system of claim 40, wherein the cleaning beam comprises a series of cleaning pulses, the SWE system further comprising means for deleting measurement samples taken during cleaning pulses.

51. The SWE system of claim 35, wherein each cleaning pulse disturbs the analysis location from a baseline condition for a first duration after the each cleaning pulse, and wherein the means for deleting measurement samples further deletes measurement samples taken during the first duration after each cleaning pulse.

52. A system for performing single wavelength ellipsometry (SWE) on a test sample, the test sample comprising a thin film on a substrate, the system comprising:
   a single beam generator for directing a cleaning beam and a measurement beam at an analysis location on the thin film, the cleaning beam removing contaminant material from the analysis location and the measurement beam producing an output beam from the analysis location, the cleaning beam and the measurement beam comprising different beams; and
   a measurement receiver for taking measurement samples of beam characteristics for the output beam.

53. The system of claim 52, the measurement beam having a first wavelength and the cleaning beam having a second wavelength, the first wavelength being different from the second wavelength.

54. The system of claim 53, wherein the substrate comprises a plurality of layers including a superficial layer, the superficial layer having a first thickness, the thin film being formed on the superficial layer, the measurement beam having a first absorption distance in the superficial layer less than the first thickness, and the cleaning beam having a second absorption distance in the superficial layer greater than the first thickness.

55. The system of claim 54, wherein the substrate comprises a silicon-on-insulator (SOI) substrate, and wherein the superficial layer comprises a silicon layer.

56. The system of claim 55, wherein the first thickness is less than 500 Å and the first wavelength is less than 390 nm.

57. The system of claim 56, wherein the single beam generator comprises:
   a laser source for providing an output beam; and
   a modulator for setting the output beam to the first wavelength to generate the measurement beam, and for setting the output beam to the second wavelength to generate the cleaning beam.

58. The system of claim 57, wherein the laser source comprises a yttrium-aluminum-garnet (YAG) laser, the first wavelength being equal to 266 nm, and the second wavelength being equal 1032 nm or 532 nm.

59. The system of claim 56, wherein the single beam generator comprises:
   a laser source for providing an output beam; and
   at least one beam adjuster for adjusting the frequency of the output beam to generate the measurement beam and the cleaning beam.

60. The system of claim 59, wherein the laser source comprises a yttrium-aluminum-garnet laser, and wherein the at least one beam adjuster comprises a first beam doubler and a second beam doubler, the first beam doubler generating the second harmonic of the output beam to provide the cleaning beam, and the second beam doubler working with the first beam doubler to generate the fourth harmonic of the output beam to provide the measurement beam.

61. The system of claim 53, wherein the single beam generator concurrently directs the measurement beam and the cleaning beam at the analysis location.

62. The system of claim 61, wherein the cleaning beam comprises a series of cleaning pulses, and wherein the single beam generator comprises a modulator for blocking the measurement beam during each cleaning pulse.

63. The system of claim 62, wherein each cleaning pulse disturbs the analysis location from a baseline condition for a first duration after the each cleaning pulse, and wherein the modulator further blocks the measurement beam for the first duration after each cleaning pulse.

64. The system of claim 61, wherein the cleaning beam comprises a series of cleaning pulses, the system further comprising data processing logic for clamping the measurement samples at a predetermined level during cleaning pulses.

65. The system of claim 64, wherein each cleaning pulse disturbs the analysis location from a baseline condition for a first duration after the each cleaning pulse, and wherein the data processing logic further clamps the measurement samples at the predetermined level for the first duration after each cleaning pulse.

66. The system of claim 61, wherein the cleaning beam comprises a series of cleaning pulses, the system further comprising data processing logic for deleting measurement samples taken during cleaning pulses.

67. The system of claim 66, wherein each cleaning pulse disturbs the analysis location from a baseline condition for a first duration after the each cleaning pulse, and wherein the data processing logic further deletes measurement samples taken during the first duration after each cleaning pulse.

* * * * *